(12) United States Patent
Zhou et al.

(10) Patent No.: US 8,985,442 B1
(45) Date of Patent: Mar. 24, 2015

(54) ONE-TOUCH PAYMENT USING HAPTIC CONTROL VIA A MESSAGING AND CALLING MULTIMEDIA SYSTEM ON MOBILE DEVICE AND WEARABLE DEVICE, CURRENCY TOKEN INTERFACE, POINT OF SALE DEVICE, AND ELECTRONIC PAYMENT CARD

(71) Applicants: Tiger T G Zhou, Tiburon, CA (US);
Dylan T X Zhou, San Gabriel, CA (US);
Andrew H B Zhou, Tiburon, CA (US)

(72) Inventors: Tiger T G Zhou, Tiburon, CA (US);
Dylan T X Zhou, San Gabriel, CA (US);
Andrew H B Zhou, Tiburon, CA (US)

( * ) Notice: Subject to any disclaimer, the term of this patent is extended or adjusted under 35 U.S.C. 154(b) by 0 days.

(21) Appl. No.: 14/555,628

(22) Filed: Nov. 27, 2014

Related U.S. Application Data

(63) Continuation-in-part of application No. 14/537,867, filed on Nov. 10, 2014, and a continuation-in-part of application No. 13/185,491, filed on Jul. 18, 2011, and a continuation-in-part of application No. 13/287,279,
(Continued)

(51) Int. Cl.
| | |
|---|---|
| *G06K 15/00* | (2006.01) |
| *G06K 5/00* | (2006.01) |
| *G06F 17/00* | (2006.01) |
| *G06F 7/00* | (2006.01) |

(Continued)

(52) U.S. Cl.
CPC .............. *G06Q 20/16* (2013.01); *G06Q 20/401* (2013.01); *G06Q 20/3227* (2013.01); *G06Q 20/3829* (2013.01); *G06Q 20/3274* (2013.01); *H04W 88/06* (2013.01)

USPC ........... 235/380; 235/375; 235/376; 235/378; 705/17; 705/26.1; 705/41; 705/64; 705/75

(58) Field of Classification Search
CPC . G06Q 20/382; G06Q 20/3674; G06Q 20/40; G06Q 20/367; G06Q 20/341; G06Q 20/12; G07F 7/1008
USPC ........ 235/380, 375, 376, 378; 705/64, 65, 67, 705/75, 77, 41, 17, 26.1
See application file for complete search history.

(56) References Cited

U.S. PATENT DOCUMENTS

| | | |
|---|---|---|
| 7,274,778 B2 | 9/2007 | Hanson et al. |
| 7,593,514 B1 | 9/2009 | Zhuang et al. |

(Continued)

OTHER PUBLICATIONS

Bill Ready, Braintree Says Goodbye to Passwords With One Touch Payments for PayPal and Venmo, and Hello to Bitcoin, Bratintree, Aug. 9, 2014.
(Continued)

*Primary Examiner* — Daniel Walsh
(74) *Attorney, Agent, or Firm* — Patent Jurist; Georgiy L. Khayet

(57) ABSTRACT

Provided are computer implemented methods and systems for messaging, calling, and one-touch payments via mobile and wearable devices. An exemplary system comprises a processor and a database in communication with the processor. The processor is configured to provide an integrated interface for selection of an activity mode. The activity mode includes a messaging mode, a calling mode, and a one-touch payment mode. The processor is further configured to receive the selection of the activity mode via the integrated interface from a user. If the messaging mode is selected, a message from the user is received and sent to a recipient via a data network. If the calling mode is selected, a data network call is initiated on a call request of the user. If the one-touch payment mode is selected, a payment request is transmitted to a financial organization.

29 Claims, 9 Drawing Sheets

Related U.S. Application Data filed on Nov. 2, 2011, and a continuation-in-part of application No. 13/620,775, filed on Sep. 15, 2012, and a continuation-in-part of application No. 13/623,944, filed on Sep. 21, 2012, and a continuation-in-part of application No. 13/661,207, filed on Oct. 26, 2012, now abandoned, and a continuation-in-part of application No. 13/753,855, filed on Jan. 30, 2013, and a continuation-in-part of application No. 13/760,214, filed on Feb. 6, 2013, and a continuation-in-part of application No. 13/776,852, filed on Feb. 26, 2013, and a continuation-in-part of application No. 13/799,023, filed on Mar. 13, 2013, and a continuation-in-part of application No. 13/875,311, filed on May 2, 2013, and a continuation-in-part of application No. 14/154,446, filed on Jan. 14, 2014, and a continuation-in-part of application No. 13/646,706, filed on Oct. 7, 2012, and a continuation-in-part of application No. 13/973,146, filed on Aug. 22, 2013, and a continuation-in-part of application No. 14/272,939, filed on May 8, 2014, now Pat. No. 8,851,372, and a continuation-in-part of application No. 14/165,826, filed on Jan. 28, 2014, and a continuation-in-part of application No. 14/198,683, filed on Mar. 6, 2014, now Pat. No. 8,968,103, and a continuation-in-part of application No. 14/334,992, filed on Jul. 18, 2014, and a continuation-in-part of application No. 14/509,027, filed on Oct. 7, 2014, and a continuation-in-part of application No. 14/458,791, filed on Aug. 13, 2014.

(51) Int. Cl.
*G06Q 20/00* (2012.01)
*G06Q 30/00* (2012.01)
*G06Q 40/00* (2012.01)
*G06Q 20/16* (2012.01)
*G06Q 20/40* (2012.01)
*G06Q 20/32* (2012.01)
*G06Q 20/38* (2012.01)
*H04W 88/06* (2009.01)

(56) References Cited

U.S. PATENT DOCUMENTS

| | | | |
|---|---|---|---|
| 8,768,778 | B2 | 7/2014 | Smith |
| 2003/0030561 | A1* | 2/2003 | Yafuso et al. ............. 340/573.4 |
| 2003/0125097 | A1* | 7/2003 | Anlauff .................... 455/575 |
| 2004/0057578 | A1* | 3/2004 | Brewer ..................... 379/433.1 |
| 2004/0224223 | A1* | 11/2004 | Sun et al. .................... 429/127 |
| 2005/0049007 | A1 | 3/2005 | Cho |
| 2005/0141700 | A1* | 6/2005 | Takeda et al. ............. 379/433.1 |
| 2009/0069045 | A1* | 3/2009 | Cheng ...................... 455/556.1 |
| 2009/0219788 | A1* | 9/2009 | Henley, Jr. .................. 368/13 |
| 2010/0332337 | A1 | 12/2010 | Bullock |
| 2011/0059769 | A1* | 3/2011 | Brunolli .................... 455/556.1 |
| 2012/0150742 | A1* | 6/2012 | Poon et al. .................. 705/44 |
| 2012/0150748 | A1* | 6/2012 | Law et al. ................... 705/71 |
| 2012/0194976 | A1* | 8/2012 | Golko et al. ............. 361/679.01 |
| 2012/0209749 | A1 | 8/2012 | Hammad et al. |
| 2012/0259780 | A1 | 10/2012 | Kang |
| 2012/0267432 | A1* | 10/2012 | Kuttuva ..................... 235/379 |
| 2012/0289188 | A1* | 11/2012 | Marcus et al. ............. 455/406 |
| 2013/0036377 | A1 | 2/2013 | Colley |
| 2013/0159173 | A1* | 6/2013 | Sivaraman et al. ........... 705/39 |
| 2014/0189354 | A1* | 7/2014 | Zhou et al. .................. 713/168 |

OTHER PUBLICATIONS

Square Inc., Download and Set Up the Cash App, 2009-2014.

* cited by examiner

ONE-TOUCH PAYMENT USING HAPTIC CONTROL VIA A MESSAGING AND CALLING MULTIMEDIA SYSTEM ON MOBILE DEVICE AND WEARABLE DEVICE, CURRENCY TOKEN INTERFACE, POINT OF SALE DEVICE, AND ELECTRONIC PAYMENT CARD

CROSS-REFERENCE TO RELATED APPLICATIONS

This application is a continuation-in-part of U.S. patent application Ser. No. 13/875,311, entitled "FACILITATING MOBILE DEVICE PAYMENTS USING MOBILE PAYMENT ACCOUNT, MOBILE BARCODE AND UNIVERSAL DIGITAL MOBILE CURRENCY," filed on May 2, 2013, U.S. patent application Ser. No. 13/620,775, entitled "METHODS AND SYSTEMS FOR FACILITATING MOBILE DEVICE PAYMENTS USING CODES AND CASHBACK BUSINESS MODEL," filed on Sep. 15, 2012, U.S. patent application Ser. No. 13/661,207, entitled "METHODS AND SYSTEMS FOR RECEIVING COMPENSATION FOR USING MOBILE PAYMENT SERVICES," filed on Oct. 26, 2012, U.S. patent application Ser. No. 13/760,214, entitled "WEARABLE PERSONAL DIGITAL DEVICE FOR FACILITATING MOBILE DEVICE PAYMENTS AND PERSONAL USE," filed on Feb. 6, 2013, U.S. patent application Ser. No. 13/973,146, entitled "WEARABLE AUGMENTED REALITY EYEGLASS COMMUNICATION DEVICE INCLUDING MOBILE PHONE AND MOBILE COMPUTING VIA VIRTUAL TOUCH SCREEN GESTURE CONTROL AND NEURON COMMAND," filed on Aug. 22, 2013, U.S. patent application Ser. No. 13/646,706, entitled "METHODS AND SYSTEMS FOR PREVENTING CARD PAYMENT FRAUD AND RECEIVING PAYMENTS USING CODES AND MOBILE DEVICES," filed on Jul. 18, 2011, U.S. patent application Ser. No. 13/287,279, entitled "METHODS AND SYSTEMS TO ADVERTISE AND SELL PRODUCTS OR SERVICES VIA CLOUD GAMING ENVIRONMENTS," filed on Nov. 2, 2011, U.S. patent application Ser. No. 13/185,491, entitled "FACILITATING MOBILE DEVICE PAYMENTS USING PRODUCT CODE SCANNING," filed on Jul. 18, 2011, U.S. patent application Ser. No. 13/623,944, filed Sep. 21, 2012, titled "FACILITATING MOBILE DEVICE PAYMENTS USING PRODUCT CODE SCANNING TO ENABLE SELF CHECKOUT", U.S. patent application Ser. No. 13/753,855, filed Jan. 30, 2013, titled "WEARABLE PERSONAL DIGITAL EYEGLASS DEVICE", U.S. patent application Ser. No. 14/154,446, filed Jan. 14, 2014, titled "SYSTEMS AND METHODS FOR ISSUING MOBILE PAYMENT CARDS VIA A MOBILE COMMUNICATION NETWORK AND INTERNET-CONNECTED DEVICES", U.S. patent application Ser. No. 14/165,826, filed Jan. 28, 2014, titled "SYSTEMS AND METHODS TO OWN A FREE COMPUTER, A FREE MOBILE DEVICE AND A FREE WEARABLE DEVICE AND LIFE TIME WARRANTY VIA THE SAME DEVICE PAYMENT CASHBACK", U.S. patent application Ser. No. 13/776,852, filed Feb. 26, 2013, titled "WEARABLE PERSONAL DIGITAL FLEXIBLE CLOUD GAME, MULTIMEDIA, COMMUNICATION AND COMPUTING DEVICE", U.S. patent application Ser. No. 14/334,992, filed Jul. 18, 2014, titled "MOBILE AND WEARABLE DEVICE PAYMENTS VIA FREE CROSS-PLATFORM MESSAGING SERVICE, FREE VOICE OVER INTERNET PROTOCOL COMMUNICATION, FREE OVER-THE-TOP CONTENT COMMUNICATION, AND UNIVERSAL DIGITAL MOBILE AND WEARABLE DEVICE CURRENCY FACES", U.S. patent application Ser. No. 14/509,027, filed Oct. 7, 2014, titled "GLOBAL WORLD UNIVERSAL DIGITAL MOBILE AND WEARABLE CURRENCY IMAGE TOKEN AND LEDGER", U.S. patent application Ser. No. 14/272,939, filed Aug. 5, 2014, titled "WEARABLE PERSONAL DIGITAL DEVICE WITH CHANGEABLE BENDABLE BATTERY AND EXPANDABLE DISPLAY USED AS STANDALONE ELECTRONIC PAYMENT CARD", U.S. patent application Ser. No. 13/799,023, filed Mar. 13, 2013, titled "METHODS AND SYSTEMS TO ADVERTISE AND SELL PRODUCTS OR SERVICES VIA A TABLE TABLET COMPUTER", U.S. patent application Ser. No. 14/198,683, filed Mar. 6, 2014, titled "SYSTEMS AND METHODS FOR DIGITAL MULTIMEDIA CAPTURE USING HAPTIC CONTROL, CLOUD VOICE CHANGER, AND PROTECTING DIGITAL MULTIMEDIA PRIVACY", U.S. patent application Ser. No. 14/537,867, filed Nov. 10, 2014, titled "INTERNET-BASED PLATFORM AND MOBILE WEB-BASED PLATFORM COMBINING ONLINE AND OFFLINE GAMING, ADVERTISING, MOBILE AND WEARABLE DIGITAL CURRENCY TOKENS, AND COMMERCE PROVIDING FREE GAMES, FREE PRODUCTS, AND FREE SERVICES FREE OF INTERCHANGE FEES", and U.S. application Ser. No. 14/458,791, filed Aug. 13, 2014, titled "SYSTEMS AND METHODS FOR MESSAGING, CALLING, DIGITAL MULTIMEDIA CAPTURE AND PAYMENT TRANSACTIONS", which are incorporated herein by reference in its entirety.

FIELD

This application relates generally to data processing, and more specifically to methods and systems for messaging, calling, and one-touch payments performed via a mobile and wearable device.

BACKGROUND

Mobile payments generally refer to payment operations performed via a mobile or wearable device. The operations performed via mobile and wearable devices may include electronic commerce transactions, retail purchasing, micropayments, and other daily payments. Mobile payments may utilize credit cards, debit cards, gift cards, and virtual currencies. While mobile payments facilitate and stimulate the trade, the procedure of providing financial details and authenticating of identity may be tedious and time-consuming. Therefore, the convenience of mobile payments for daily micropayments is hindered.

Additionally, a mobile or wearable device is often used as an authorization factor, for example, by positioning the mobile device or by sending a one-time code to the mobile device. This allows recognizing and counteracting the credit card data theft and increasing security of mobile payments.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Provided are computer implemented methods and systems for messaging, calling, and one-touch payments via a mobile and wearable device. Using the methods or systems described herein a user may perform fast electronic payments from any location. For this purpose, the user may register with the messaging, calling, and one-touch payment system. During the registration the user may provide his financial information. The financial information may include bank account information, credit card information, debit card information, gift card information, prepaid card information, insurance account information, merchant account information, mobile currency information, digital money account, SDK payment information, in-app payment information, social networking payment information, prepaid card information, API payment information, mobile account payment information, mobile currency information, and so forth. When required, the user may activate an integrated interface of the messaging, calling, and one-touch payment system. The integrated interface may be displayed over the video output of the device and overlap other applications or pages. The integrated interface may provide for selection activity modes including a messaging mode, a calling mode, and a one-touch payment mode. Through the integrated interface the messaging, calling, and one-touch payment system may receive the selection of the activity mode. If the messaging mode is selected, a message from the user may be received and sent to a recipient via a data network. If the calling mode is selected, a data network call may be initiated on a call request of the user. If the one-touch payment mode is selected, a payment request may be transmitted to a financial organization. The payment request may be generated using data of an actual page on the mobile and wearable device and the financial information of the user provided during the registration.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF DRAWINGS

Embodiments are illustrated by way of example and not limitation in the figures of the accompanying drawings, in which like references indicate similar elements and in which.

DETAILED DESCRIPTION

In the following description, numerous specific details are set forth in order to provide a thorough understanding of the presented concepts. The presented concepts may be practiced without some or all of these specific details. In other instances, well known process operations have not been described in detail so as to not unnecessarily obscure the described concepts. While some concepts will be described in conjunction with the specific embodiments, it will be understood that these embodiments are not intended to be limiting.

Various computer implemented methods and systems for messaging, calling, and one-touch payments via a mobile and wearable device are described herein. Expansion of computer networks (Internet) gave rise to a new type of trade—electronic trade, while proliferation of mobile devices (e.g., cell phones/smart phones and other similar devices) that are capable of internet communications take electronic trade even further. A customer can shop online from any location using a mobile device. Therefore, mobile payment services gain increasing importance. However, time-consuming payment process, providing financial details, authorization, and other actions may result in a potential buyer changing his mind with respect to a purchase. Accelerated payment procedure may facilitate electronic purchases and stimulate electronic trade.

Figure 1:
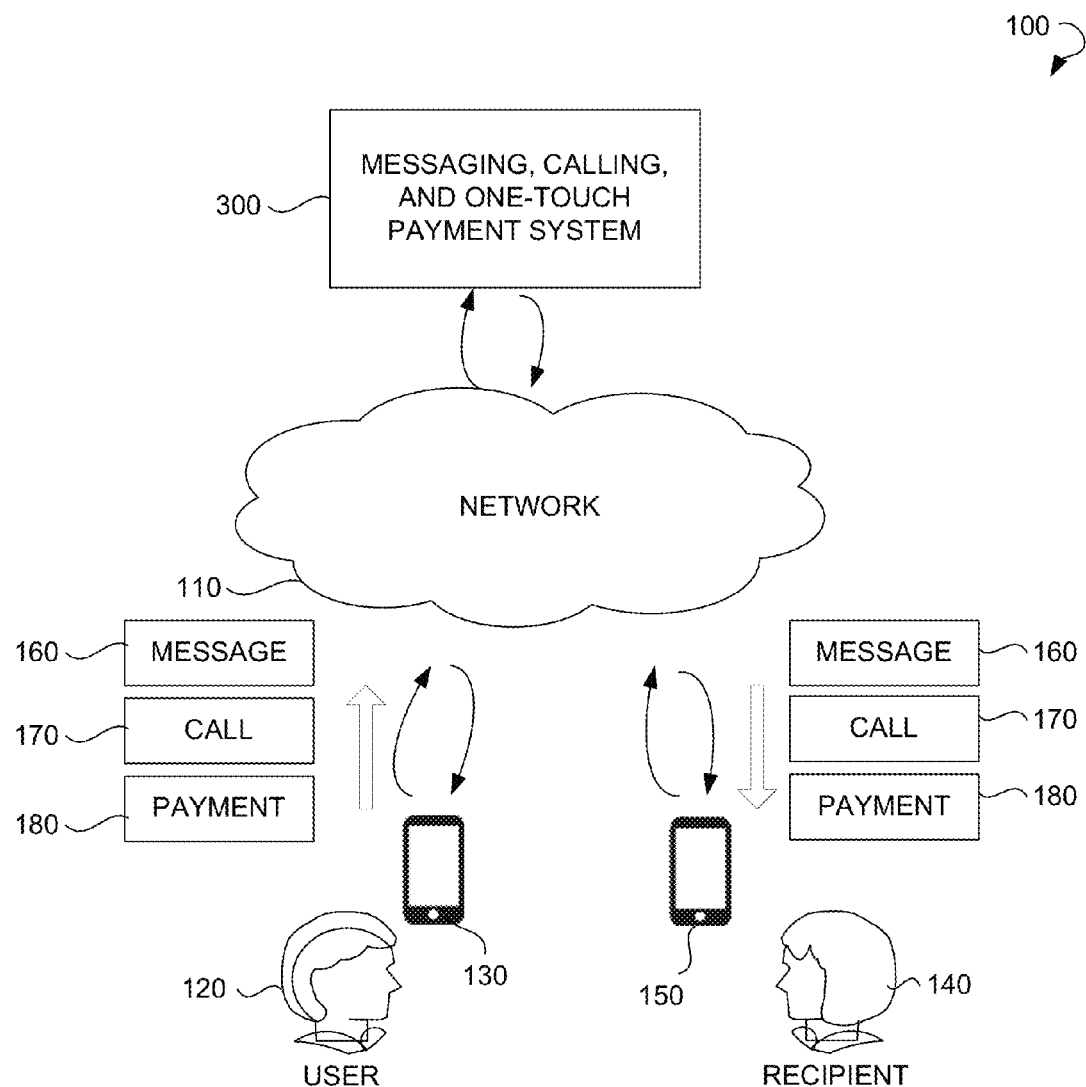
FIG. 1 is a block diagram showing an environment within which a method and system for messaging, calling, and one-touch payments via a mobile and wearable device can be implemented, in accordance with an example embodiment.

Referring now to the drawings, FIG. 1 illustrates an environment 100 within which systems and methods for messaging, calling, and one-touch payments via a mobile and wearable device can be implemented. The environment 100 may include a user 120, a client device 130, network 110, a messaging, calling, and one-touch payment system 300. On a user request, the messaging, calling, and one-touch payment system 300 may provide an integrated interface on a display of the client device 130. The client device may include a smart phone, a tablet PC, a lap top, an augmented reality glasses, a smart watch, and so forth.

Via the integrated interface, the user 120 may exchange messages 160 with a recipient 140, make calls 170, and perform one-touch payments 180.

The messages 160, calls 170, and one-touch payments 180 are transmitted to the system 300 and further to the recipient 140 or payee (not shown) via the network 110 using the client device 130.

The network 110 may include the Internet or any other network capable of communicating data between devices. Suitable networks may include or interface with any one or more of, for instance, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, Digital Data Service (DDS) connection, DSL (Digital Subscriber Line) connection, an Ethernet connection, an ISDN (Integrated Services Digital Network) line, a dial-up port such as a V.90, V.34 or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), CDMA (Code Division Multiple Access) or TDMA (Time Division Multiple Access), cellular phone networks, GPS (Global Positioning System), CDPD (cellular digital packet data), RIM (Research in Motion, Limited) duplex paging network, Bluetooth radio, or an IEEE 802.11-based radio frequency network. The network 110 can further include or interface with any one or more of an RS-232 serial connection, an IEEE-1394 (Firewire) connection, a Fiber Channel connection, an IrDA (infrared) port, a SCSI (Small Computer Systems Interface) connection, a Universal Serial Bus (USB) connection or other wired or wireless, digital or analog interface or connection, mesh or Digi® networking. The network 110 may include any suitable number and type of devices (e.g., routers and switches) for forwarding commands, content, and/or web object requests from each client to the online community application and responses back to the clients.

Figure 2:
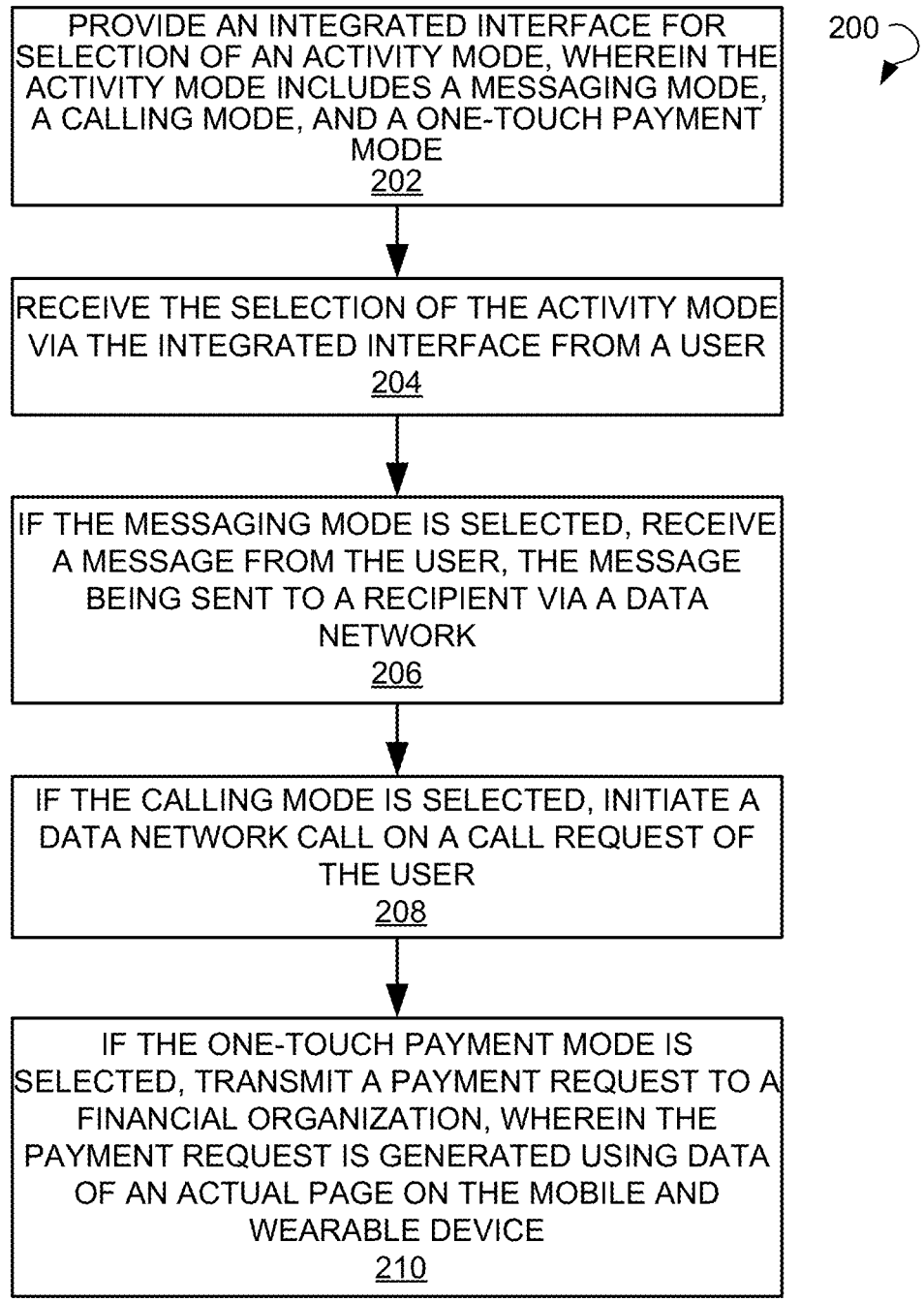
FIG. 2 is a block diagram showing various modules of the messaging, calling, and one-touch payment system, in accordance with certain embodiments.

FIG. 2 is a flow chart illustrating a method 200 for messaging, calling, and one-touch payments via a mobile and wearable device, in accordance with some example embodiments. The method 200 may be performed by logic that may comprise hardware (e.g., dedicated logic, programmable logic, and microcode), software (such as software run on a general-purpose computer system or a dedicated machine), or a combination of both. In one example embodiment, the processing logic resides at the system 300 for providing compensation for using a mobile payment service, and the various elements of the system 300 can perform the method 200. It will be appreciated by one of ordinary skill that examples of the foregoing modules may be virtual, and instructions said to be executed by a module may, in fact, be retrieved and executed by software. Although various elements may be configured to perform some or all of the various operations described herein, fewer or more elements may be provided and still fall within the scope of various embodiments.

As shown in FIG. 2, the method 200 may commence at operation 202 with providing an integrated interface for selection of an activity mode. The integrated interface may be providing on receiving a request to initiate the integrated interface from the user. To initiate the integrated interface, the user may be prompted to provide a password, a code, a voice command, biometric data, and so forth.

Figure 4:
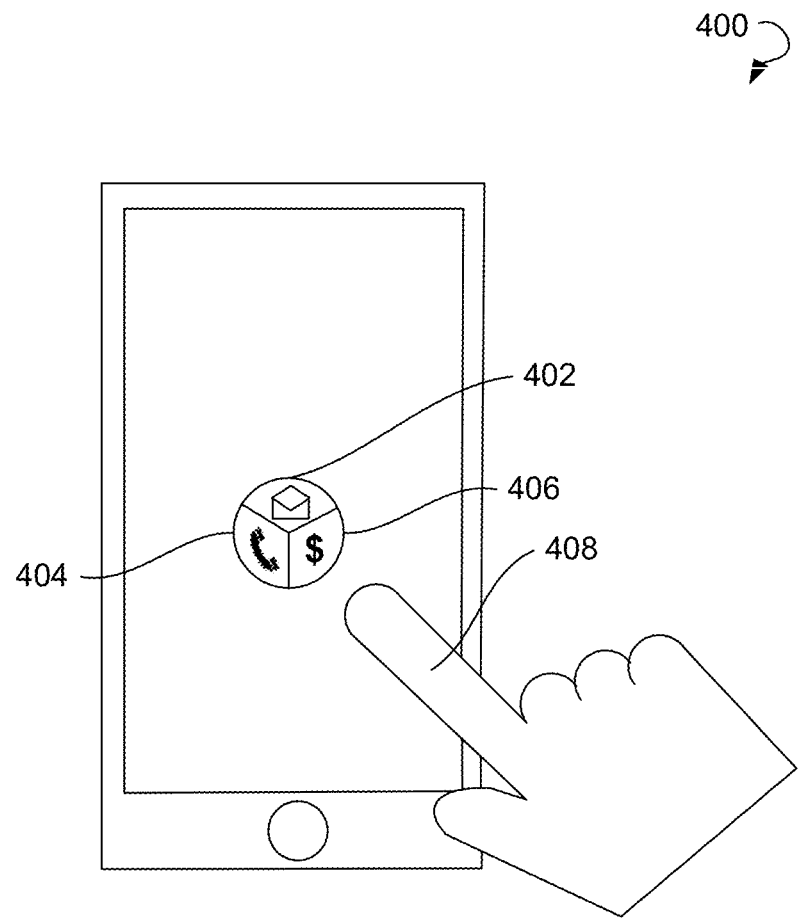
FIG. 4 is a block diagram illustrating an integrated interface, in accordance with certain embodiments.

The activity mode may include a messaging mode, a calling mode, and a one-touch payment mode. The integrated interface may be provided on a user request via a screen of the mobile and wearable device (as illustrated by FIG. 4 which will be described in detail below). The integrated interface may be integrated with at least one mobile application associated with the mobile and wearable device. For example, the integrated interface may be displayed atop other visual output of the mobile and wearable device. When the user desires to send a message, call, or make a payment, the user may select the activity more by touching a specific portion of the integrated interface. Additionally, the selection of the activity mode may include a voice command, a haptic interaction with a touchscreen, a move command, and so forth. The selection of the activity mode may be received via the integrated interface at operation 204.

The system 300 may determine the selected activity mode and perform a corresponding action based on the selection. If the messaging mode is selected, the system 300 may provide to the user a messaging interface on the mobile and wearable device at operation 206. Through the messaging interface a message may be received from the user and sent to a recipient via a data network. The message may include a text, an audio, a video, and geographical data. Additionally, messages may be received from other users. The integrated interface may notify the user that one or more messages were received. The user may activate the messaging interface to read and/or reply to the messages.

If the calling mode is selected at operation 204, a calling interface may be provided to the user. The user may select a call recipient in his contacts and make a call request. The system 300 may receive the call request from the user. Based on the call request, the system 300 may initiate a data network call at operation 208. The call may include an audio call, a video call, a holographic video call, and so forth. The call may be performed via a Voice over Internet Protocol (VoIP) service, a free Over-the-Top (OTT) service, and so forth. The free VoIP service and the free OTT service include voice communication, fax, text messaging, voice messaging, video communication, and multimedia transmission. In various embodiments, the free VoIP service and the free OTT service are provided via Wi-Fi, 3G network, 4G network, 5G network, 6G network or upper.

If the one-touch payment mode is selected, a payment request may be transmitted to a financial organization at operation 210. The financial organization performing the payment may be a bank, a credit company, a virtual currency system, and so forth. The payment request may be generated using data of a mobile application or a page from which the one-touch payment mode is activated. For example, the user may activate the one-touch payment from a purchase page of an online store. The payment may be immediately initiated without requesting further details. Data of a payment recipient and a payment amount may be received from the actual page or application and financial information of the user may be stored in the database of the messaging, calling, and one-touch payment system 300. The user financial information may be provided by the user during registration with the messaging, calling, and one-touch payment system and may include one or more of the following: bank account information, credit card information, debit card information, gift card information, prepaid card information, insurance account information, merchant account information, mobile currency information, digital money, and so forth. Online payments can be secured by two-factor authorization. One of the factors may be authorization on the integrated interface initiation, and the other factor may include locating the mobile and wearable device associated with the user and comparing the location with the location where the payment is requested.

In an example embodiment, the one-touch payment mode may be used for internet payments. Furthermore, the one-touch payment mode may be integrated with text messaging, hold-to-talk voice messaging, broadcast messaging, sharing of photographs and videos, and location sharing. The one-touch payment mode may be associated with exchanging contacts and payments with users nearby via Bluetooth, providing contacting the users at random one-touch payment. The one-touch payment mode may be associated with social networking services. Additionally, the one-touch payment mode may have a common interface with a proprietary, cross-platform instant messaging subscription service for mobile and wearable devices.

In an example embodiment, the one-touch payment mode may be integrated with a telecommunications application software specializing in providing a video chat, a voice call, and a conference call from mobile and wearable devices. The one-touch payment mode may be compatible with one or more operating systems, wherein the one or more operating systems include Microsoft Windows, Mac, Linux, Android, Blackberry, iOS, and Windows Phone. A one-touch payment service provided using the one-touch payment mode is free. The one-touch payment mode may include a freemium mode, at which a product or service is provided free of charge, but money is charged for proprietary features, functionality, or virtual goods.

In a further example embodiment, the one-touch payment mode may be associated with providing the user with an option to make online purchases and offline purchases using a single touch, In this case, the user uses a predefined address and a predefined payment information, for example, payment information needed to complete the purchase having been entered by the user previously.

The method 200 may further comprise encrypting, by the processor, the payment request associated with the one-touch payment mode to obtain an encrypted payment request. The encrypted payment request may be decryptable by an ephemeral messaging, one-touch payment, and multimedia application associated with a mobile and wearable device of the recipient. The encrypted payment request may be removed from the mobile and wearable device of the recipient after being read. The method 200 may further comprise receiving, by the processor, from the user, a registration request to register the user in a mobile payment service. The user may send the registration request via a mobile payment application associated with the mobile and wearable device. The mobile payment application may provide at least a free VoIP service and a free Over-the-Top (OTT) service. The ephemeral messaging, one-touch payment, and multimedia application may be associated with an application protocol, the application protocol being integrated into a communication platform.

In an example embodiment, the mobile and wearable device may comprise a band adapted to secure the mobile and wearable device on a human body. The human body may include a wrist, an arm, a neck, a head, a leg, a waist, an ear, a finger, and any other part of the human body. The band may be adapted to secure the mobile and wearable device under, within or on clothing. The band may include a rechargeable battery configured to power the mobile and wearable device.

In a further example embodiment, the mobile and wearable device may be configured to act as one or more of the following: a mechanical hybrid smart watch, a smart watch, a digital computing glasses, a digital bracelet, a mobile internet device, a mobile web device, a smartphone, a tablet computer, a wearable computer, a calculator watch, a smartwatch, a head-mounted display, a personal digital assistant, a enterprise digital assistant, a calculator, a handheld game console, a portable media player, an ultra-mobile personal computer, a digital still camera, a digital video camera, a mobile phone, a feature phone, a pager, and a personal navigation device.

The mobile and wearable device may further comprise one or more haptic control elements to control operation or functions of the mobile and wearable device. Access to the mobile and wearable device may be controlled by one or more of the following: a password, a Personal Identification Number code, and biometric authorization. The biometric authorization may include fingerprint scanning, palm scanning, face scanning, and retina scanning. The scanning may be performed using the one or more biometric sensors. The one or more biometric sensors may include sensors for sensing a command for the one-touch payment mode, the sensing may be shown on the display. The mobile and wearable device may further comprise a fingerprint reader configured to scan a fingerprint, the scanned fingerprint may be matched to one or more approved fingerprints. The access to the mobile and wearable personal digital may be granted based on the matching.

The mobile and wearable device may further include a camera configured to capture one or more barcodes. The one or more barcodes may include electronic key data, a link to a web-resource, a payment request, and advertising information. One or more barcodes may include a linear dimensional code, a two-dimensional code, a snap tag code, and a QR code, and other machine readable code.

The mobile and wearable device may be associated with an electronic payment card configured to act as one or more of a smart card, a proximity card, an integrated circuit card, a magnetic strip card, and an electronic payment card. The electronic payment card may store card data of one or more debit cards, credit cards, gift cards, loyalty cards, prepaid cards, bank cards, identity cards, and membership cards. The electronic payment card may be configured to attach to the mobile and wearable device.

The mobile and wearable device may be operable to obtain information about a payment system of the user. The mobile and wearable device may be further operable to generate and display a barcode that encodes user payment information. The barcode may be scanned at a checkout counter and processed to retrieve the user payment information from a database of a payment processing system. The user payment information may be used to transfer funds between the user and a merchant.

In a further example embodiment, the method 200 may further include scanning the code being present on a one-touch QR code invoice. The one-touch QR code invoice may be associated with one or more of an invoice, a credit note, a debit note, a pro forma invoice, and an advance invoice. The one-touch QR code invoice may store one or more of invoice data, monetary amount summary, product data, service data, merchant data, invoice number, and amount to be paid. The one-touch payment information may be stored in the mobile and wearable device associated with the user. The user may activate the one-touch payment mode by holding the mobile and wearable device near a contactless reader and activating a one-touch payment icon on the mobile and wearable device.

Figure 3:
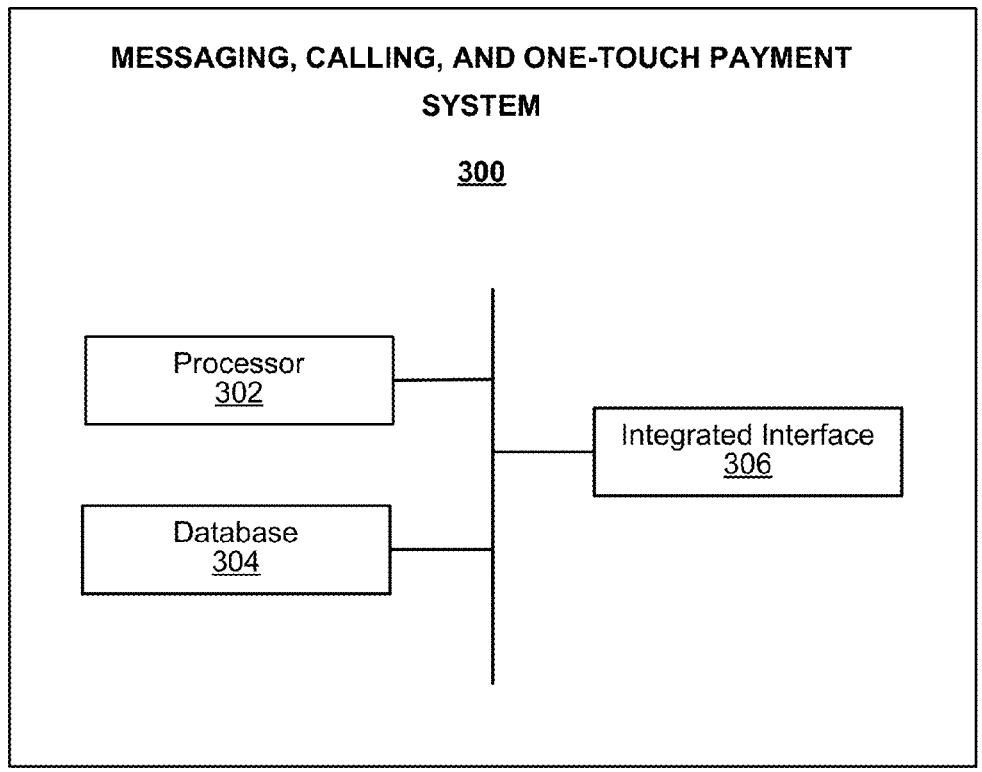
FIG. 3 is a flow chart illustrating a method for messaging, calling, and one-touch payments via a mobile and wearable device, in accordance with certain embodiments.

FIG. 3 is a block diagram showing various modules of the system 300 for messaging, calling, and one-touch payments, in accordance with certain embodiments. The system 300 may comprise a processor 302 a database 304, and an optional integrated interface 306. The processor 302 may include a programmable processor, such as a microcontroller, central processing unit (CPU), and so forth. In other embodiments, the processor 302 may include an application-specific integrated circuit (ASIC) or programmable logic array (PLA), such as a field programmable gate array (FPGA), designed to implement the functions performed by the system 300. Thus, the processor 302 may provide an integrated interface for selection of an activity mode. The activity mode may include a messaging mode, a calling mode, and a one-touch payment mode. The processor 302 may further receive the selection of the activity mode via the integrated interface 306 from a user. If the messaging mode is selected, the processor 302 may receive a message from the user and send the message to a recipient via a data network. In an example embodiment, the message may be sent to a controlled list of recipients. The user may set a time limit for the recipient to view the message. After the time limit, the message may be deleted from a mobile and wearable device associated with the recipient.

If the calling mode is selected, the processor 302 may initiate a data network call on a call request of the user. The data network call may be made via a free VoIP service, a free Over-the-Top (OTT) service, and so forth. If the one-touch payment mode is selected, the processor may transmit a payment request to a financial organization. The payment request may be generated using data of an actual page (in view) on the mobile and wearable device. Additionally, the payment request may include financial data of the user. The financial data of the user may be stored in the database 304. The payment can be associated with transactional payments based on Unstructured Supplementary Service Data (USSD) or Short Message Service (SMS), direct operator billing, credit card mobile payments, online wallets, QR code payments, contactless near field communication, cloud-based mobile payments, audio signal-based payment, Bluetooth Low Energy (BLE) signal beacon payment, in-application payment, SDK payment, API payment, social networking payment, and direct carrier/bank co-operation.

Contactless near field communication (NFC) may be used to receive data for the payment request. For example, when the one-touch payment mode is selected, the user may make a payment for purchases in physical stores or transportation services. The mobile and wearable device may be equipped with a smart card. When a user waves the mobile and wearable device near a radar module, a payment is made. In some cases, the payment may require authentication. The NFC payment could be deducted from a pre-paid account or changed to a mobile or band account directly. NFC payment may include displaying a barcode on the mobile device screen for mobile payment. The payment barcode can include one or more of the following: a linear barcode, a two-dimensional barcode, a three-dimensional barcode, a machine readable code, and so forth.

The audio channel of the mobile phone may be another wireless interface that is used to receive data for a payment request. Chip, ultra sound and acoustic features of the mobile and wearable device may support mobile payments. Near sound data transfer (NDST), data over voice and NFC produce audio signatures that the mobile phone can pick up to enable electronic transactions.

In some embodiments, a beacon mobile payment sends out a Bluetooth Low Energy (BLE) signal to anyone or any device with mobile application to transfer payment data and get electronic receipt. When a customer checks in, their picture and name may pop up on the retailer's point-of-sale system, when a sales associate at the store totals a bill on a cash register or a card-reading terminal, the beacon mobile payment user gives verbal confirmation to the associate, who matches the customer with the picture on the POS screen and concludes the transaction.

In some embodiments, the system 300 may be associated with one or more of a transactional payment based on Unstructured Supplementary Service Data, Short Message Service, direct operator billing, a credit card mobile payment, an online wallet, a QR code payment, contactless near field communication payment, a cloud-based mobile payment, an audio signal-based payment, a Bluetooth Low Energy signal beacon payment, an in-application payment, a software development kit (SDK) payment, an application programming interface (API) payment, a social networking payment, and a direct carrier and bank co-operation. wherein the system is compatible with a third party application, wherein the system is associated with one or more of an API and an SDK. Additionally, the system 300 may be associated with a fingerprint touch recognition payment, a fingerprint press recognition payment, a gesture mark payment, a voice command payment, and a eye blink payment, a fingerprint swipe recognition payment, and a nod payment.

FIG. 4 is a block diagram illustrating an initiated integrated interface 400 on a screen of the mobile and wearable device, in accordance with certain embodiments. The user initiates the integrated interface 400. The integrated interface may overlap mobile applications running on the mobile and wearable device. Thus, the user may select an activity mode whenever he desires without additional actions. The activity modes may include a messaging mode 402, a calling mode 404, and a one-touch payment mode. The user, for example, by a touch of a hand 408, may select one of the activity modes. The user selection may be transmitted to the system 300, and the system may provide the corresponding interface to receive a message or a call request, or extract data from the page in view on the mobile and wearable device to make a payment.

Figure 5:
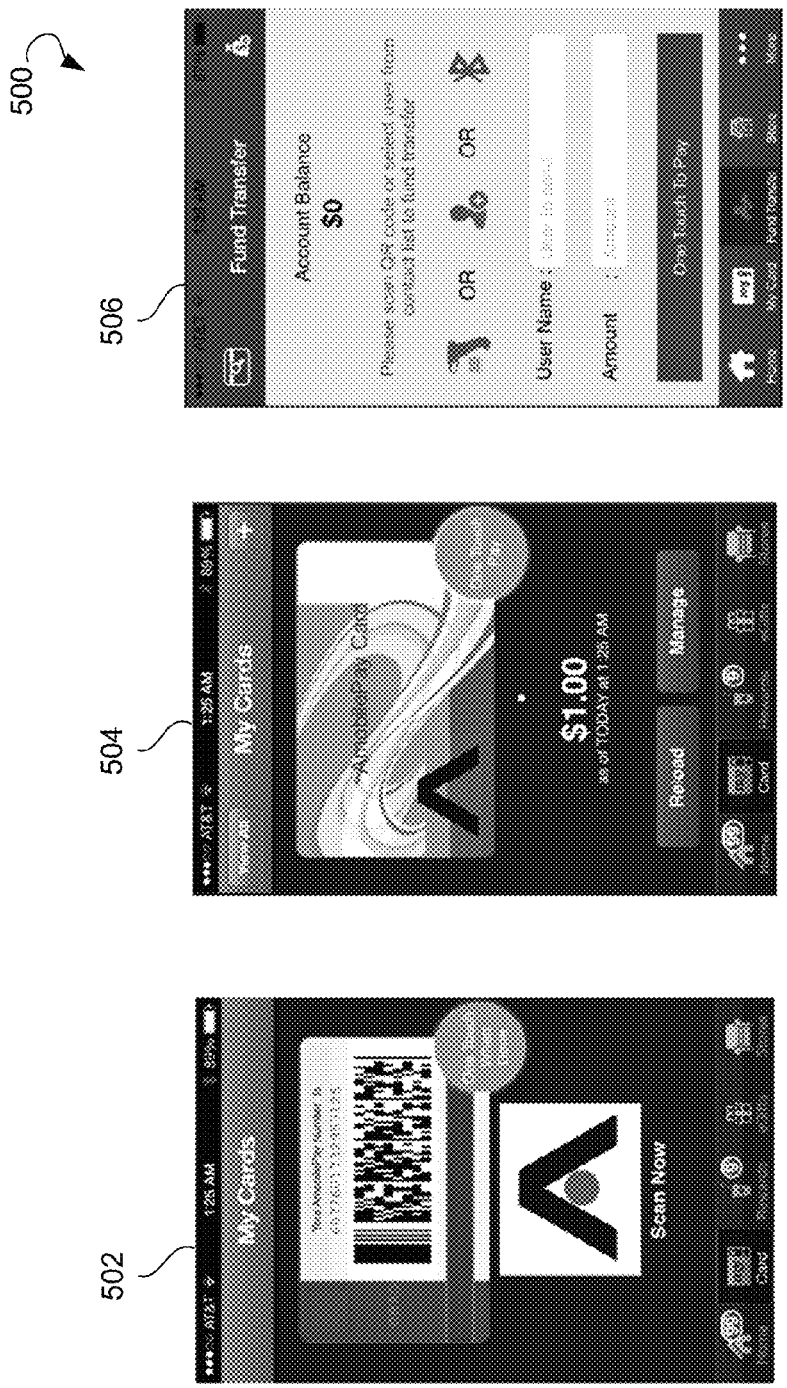
FIG. 5 is a block diagram illustrating example screens of the messaging, calling, and one-touch payment system, in accordance with certain embodiments.

FIG. 5 is a block diagram illustrating example screens 500 of the messaging, calling, and one-touch payment system, in accordance with certain embodiments. Screen 502 illustrates providing financial information of the user to the system 300. The user may capture credit or debit cards, provide details of bank accounts, virtual currency wallets, and so forth. The provided financial data may be stored and/or transmitted to the database in an encoded form as shown by screen 502. The user may set of the cards or wallets as a default payment account. The default payment account may be used when a one-touch payment is selected. Additionally, user information, such as phone number, an email address, a payment name, and so forth may be stored in the mobile application or an online resource associated with the system 300.

In some embodiments, the user may select one of the stored payment accounts to perform a payment. Authentication may be made when the user accesses the system 300. The authentication may include password authentication, voice authentication, biometric authentication, and so forth.

Furthermore, using the system 300 the user may create automatic payments. For example, as shown on screen 504, the user may give instructions to transfer 1$ to a specific account every week day at 1:25 PM. The system 300 may receive the instructions and automatically perform the payment according to the instructions. After a predefined period, for example, after one month, or every week, or every year, the system 300 may prompt the user either to prolong the automatic payment or to cancel the payment.

Screen 506 illustrates on-request payments made via the system 300. The user may select to generate a barcode to be scanned from the screen of the device or sent to a payment recipient. Alternatively, the user may select a further user from his contact list to transfer a certain amount to the selected user. Additionally, money transfer may be performed via Bluetooth.

Figure 6:
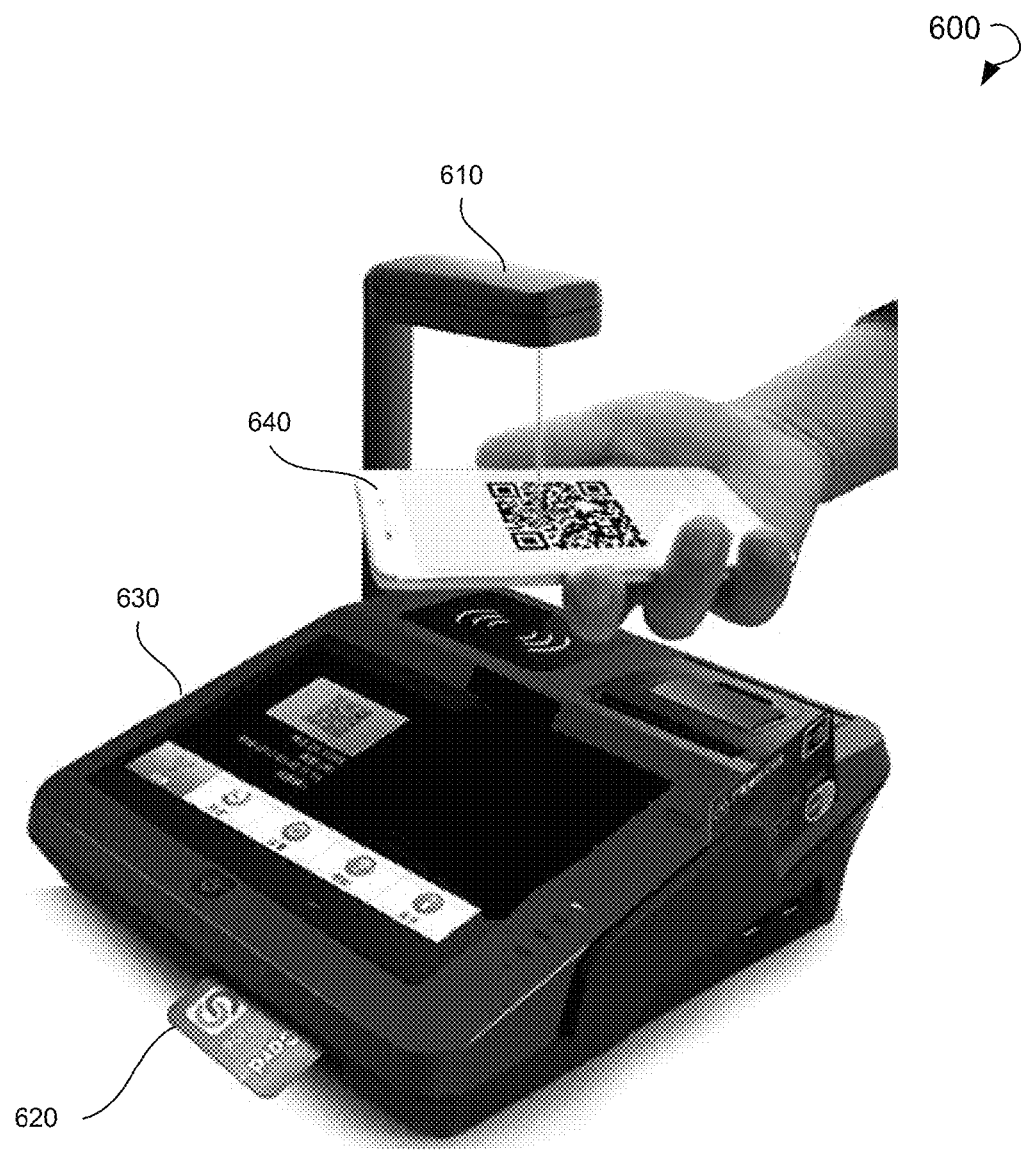
FIG. 6 illustrates scanning barcode from a mobile or wearable device of the user, in accordance with certain embodiments.

FIG. 6 illustrates scanning barcode 600 from a mobile or wearable device 640 of the user. The barcode may be scanned by a barcode scanner 610 of a point of sale terminal 630. The barcode scanner 610 may be configured to encrypt data of the scanned barcode or a card 620 swiped through the point of sale terminal 630. Additionally the point of sale terminal 630 may be configured to send messages to one or more social networks.

In some embodiments, access to the barcode scanner, point of sale system, and the mobile and wearable device may be protected by fingerprint scanning.

Figure 7:
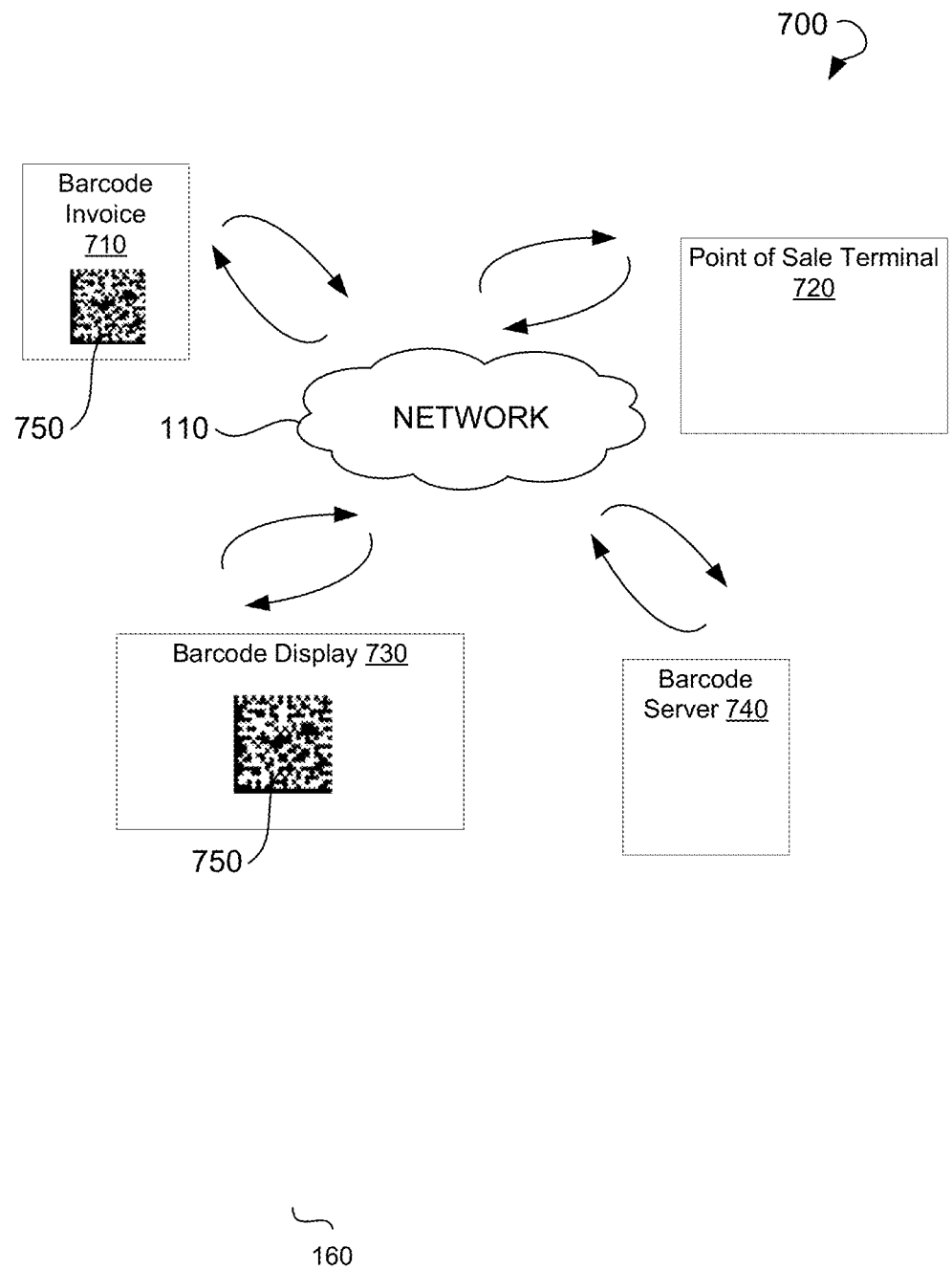
FIG. 7 illustrates using a barcode invoice at a point of sale terminal, in accordance with certain embodiments.

FIG. 7 illustrates using a barcode invoice at a point of sale terminal, in accordance with certain embodiments. FIG. 7 shows a barcode invoice 710, a barcode display 730 for displaying a barcode 750, a point of sale terminal 720, and a barcode server 740 communicating to each other via the network 110. The barcode 750 may be stored on the barcode server 740. The barcode invoice 710 may be printed by the point of sale terminal 720 upon scanning the barcode 750 from a mobile and wearable device (not shown).

Figure 8:
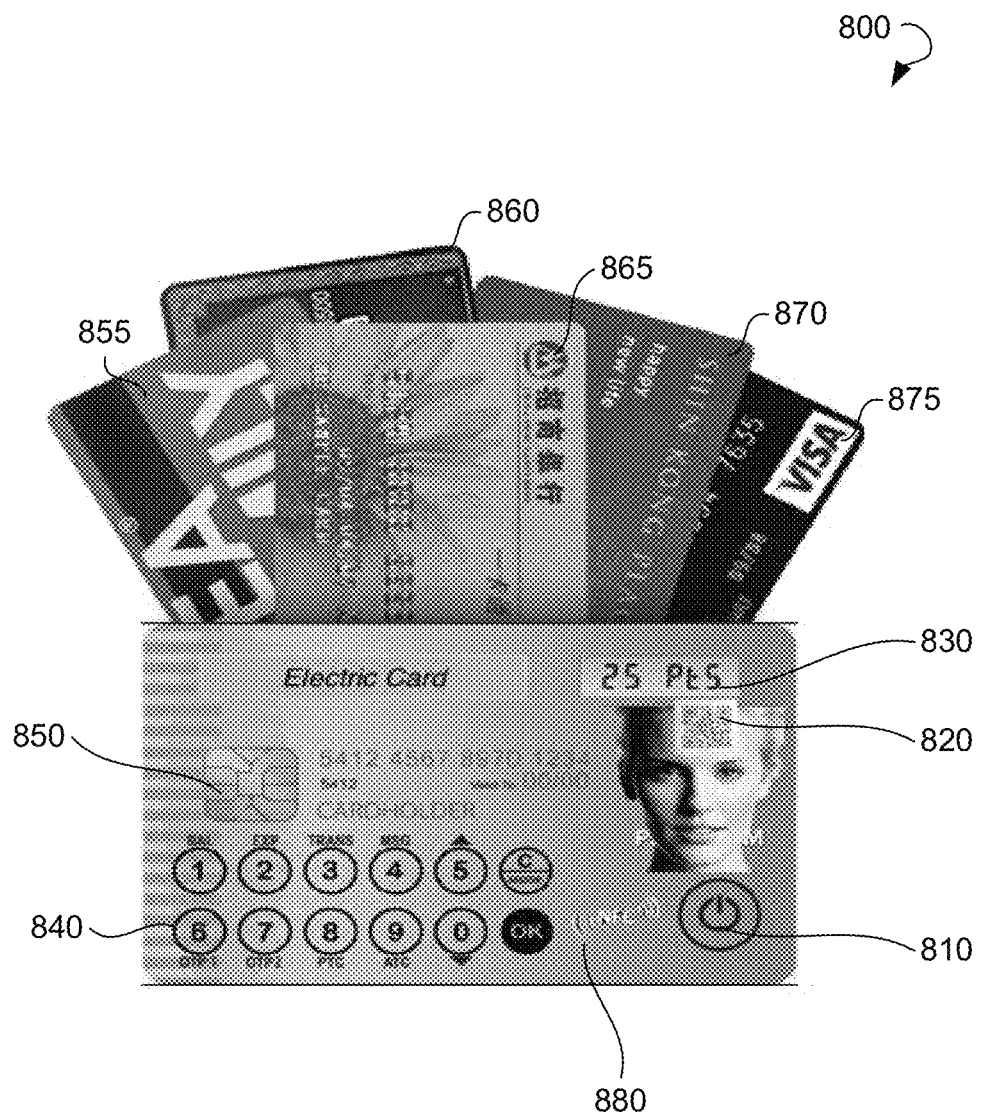
FIG. 8 shows an electronic payment card, in accordance with certain embodiments.

FIG. 8 shows an electronic payment card 800 that can be used in the messaging, calling, and one-touch payment system. In an example embodiment, the electronic payment card 800 may include a one-touch payment button 810, a code 820, such as a QR-code, a display 830, a keyboard 840, a chip 850, such as an EMV (Europay, MasterCard, and VISA) chip, and an NFC chip 880 for contactless NFC. The electronic payment card 800 may include data of several payments cards, shown as payment cards 855, 860, 865, 870, and 875. The data of the payment cards 855, 860, 865, 870, and 875 may be stored on the electronic payment card 800. Therefore, the user does not need to carry many payment cards during shopping. The user may use the electronic payment card 800 and select which of the payment cards 855, 860, 865, 870, and 875 is to be read at a point of sale terminal in a shop.

Figure 9:
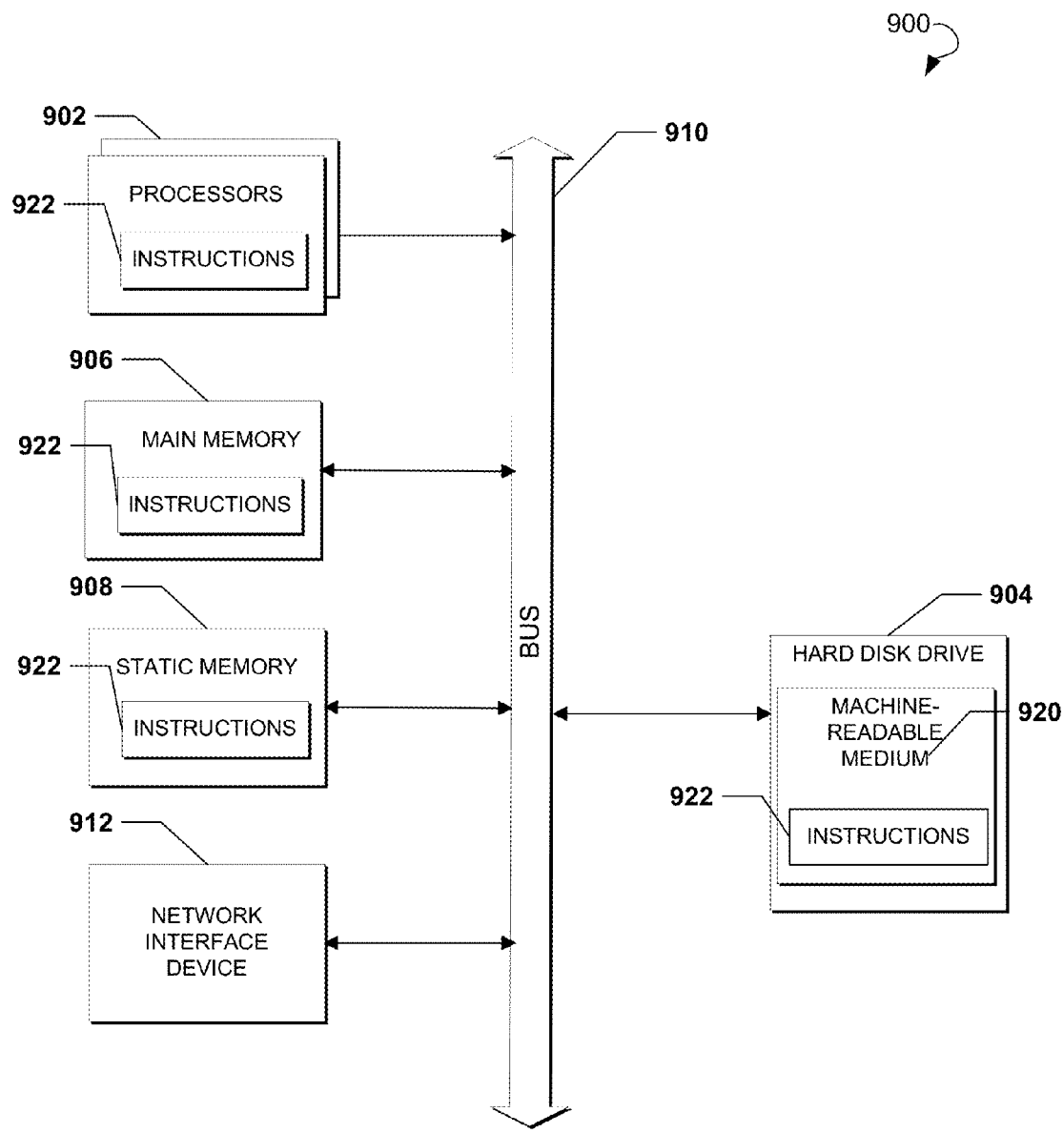
FIG. 9 shows a diagrammatic representation of a computing device for a machine in the exemplary electronic form of a computer system, within which a set of instructions for causing the machine to perform any one or more of the methodologies discussed herein, can be executed.

FIG. 9 shows a diagrammatic representation of a computing device for a machine in the exemplary electronic form of a computer system 900, within which a set of instructions for causing the machine to perform any one or more of the methodologies discussed herein can be executed. In various exemplary embodiments, the machine operates as a standalone device or can be connected (e.g., networked) to other machines. In a networked deployment, the machine can operate in the capacity of a server or a client machine in a server-client network environment, or as a peer machine in a peer-to-peer (or distributed) network environment. The machine can be a personal computer (PC), a tablet PC, a set-top box (STB), a cellular telephone, a digital camera, a portable music player (e.g., a portable hard drive audio device, such as an Moving Picture Experts Group Audio Layer 3 (MP3) player), a web appliance, a network router, a switch, a bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor or multiple processors 902, a hard disk drive 904, a main memory 906 and a static memory 908, which communicate with each other via a bus 910. The computer system 900 may also include a network interface device 912. The hard disk drive 904 may include a computer-readable medium 920, which stores one or more sets of instructions 922 embodying or utilized by any one or more of the methodologies or functions described herein. The instructions 922 can also reside, completely or at least partially, within the main memory 906 and/or within the processors 902 during execution thereof by the computer system 900. The main memory 906 and the processors 902 also constitute machine-readable media.

While the computer-readable medium 920 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media. Such media can also include, without limitation, hard disks, floppy disks, NAND or NOR flash memory, digital video disks, RAM, ROM, and the like.

The exemplary embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software programs for implementing the present method can be written in any number of suitable programming languages such as, for example, C, C++, C# or other compilers, assemblers, interpreters or other computer languages or platforms.

Thus, various systems and methods for messaging, calling, and one-touch payments via a mobile and wearable device have been described. Although embodiments have been described with reference to specific example embodiments, it will be evident that various modifications and changes may be made to these embodiments without departing from the broader spirit and scope of the system and method described herein. Accordingly, the specification and drawings are to be regarded in an illustrative rather than a restrictive sense.

What is claimed is:

1. A method for messaging, calling, and one-touch payments via a mobile and wearable device, the method comprising:
   providing, by a processor of the mobile and wearable device, an integrated interface for selection of an activity mode, wherein the activity mode includes a messaging mode, a calling mode, and a one-touch payment mode;
   receiving, by the processor, the selection of the activity mode via the integrated interface from a user;
   if the messaging mode is selected, receiving, by the processor, a message from the user, the message being sent to a recipient via a data network;
   if the calling mode is selected, initiating, by the processor, a data network call on a call request of the user;
   if the one-touch payment mode is selected, transmitting a payment request to a financial organization, wherein the payment request is generated using data of an actual page on the mobile and wearable device;
   encrypting, by the processor, the payment request associated with the one-touch payment mode to obtain an encrypted payment request, wherein the encrypted payment request is decryptable by an ephemeral messaging, one-touch payment, and multimedia application of a mobile and wearable device of the recipient, wherein the encrypted payment request is removed from the mobile and wearable device of the recipient after the encrypted payment request is optically read;
   wherein the ephemeral messaging, one-touch payment, and multimedia application is associated with an application protocol, the application protocol being integrated into a communication platform; and
   receiving, by the processor, from the user, a registration request to register the user in a mobile payment service, wherein the user sends the registration request via a mobile payment application associated with the mobile and wearable device, the mobile payment application providing at least a free Voice over Internet Protocol (VoIP) service and a free Over-the-Top (OTT) service;

wherein the mobile and wearable device comprises a band adapted to secure the mobile and wearable device on a human body, the human body including a wrist, an arm, a neck, a head, a leg, a waist, an ear, and a finger, wherein the band is adapted to secure the mobile and wearable device under, within or on clothing, wherein the band includes a rechargeable, wherein the receiving of the selection of the activity mode includes a voice command, a haptic interaction with a touchscreen of the mobile and wearable device, and a move command, wherein the mobile and wearable device comprises one or more haptic control elements to control operation or functions of the mobile and wearable device, and wherein access to the mobile and wearable device is controlled by one or more of the following: a password, a Personal Identification Number code, and biometric authorization, the biometric authorization including fingerprint scanning, palm scanning, face scanning, and retina scanning, wherein the scanning is performed using the one or more biometric sensors, wherein the one or more biometric sensors include sensors for sensing a command for the one-touch payment mode, the sensing shown on the display, the mobile and wearable device further comprising a fingerprint reader configured to scan a fingerprint, the scanned fingerprint being matched to one or more approved fingerprints, wherein access to the mobile and wearable personal digital is granted based on the matching;

wherein the mobile and wearable device further comprises a camera configured to capture one or more codes, the one or more codes including electronic key data, a link to a web-resource, a payment request, and advertising information, wherein the one or more codes include barcode, a linear dimensional code, a two-dimensional code, a snap tag code, and a QR code;

wherein the mobile and wearable device is operable to obtain information about a payment system of the user, wherein the mobile and wearable device is operable to generate and display a barcode that encodes user payment information, the barcode being scanned at a checkout counter and processed to retrieve the user payment information from a database of a payment processing system, the user payment information being used to transfer funds between the user and the recipient, wherein the recipient merchant;

wherein the mobile and wearable device is associated with an electronic payment card configured to act as one or more of a smart card, a proximity card, an integrated circuit card, a magnetic strip card, and an electronic payment card, the electronic payment card storing card data of one or more debit cards, credit cards, gift cards, loyalty cards, prepaid cards, bank cards, identity cards, and membership cards, wherein the electronic payment card is configured to attach to the mobile and wearable device;

wherein the method further comprises scanning the code, the code being present on a one-touch QR code invoice, the one-touch QR code invoice storing one or more of invoice data, monetary amount summary, product data, service data, merchant data, invoice number, and amount to be paid, the one-touch QR code invoice being associated with one or more of an invoice, a credit note, a debit note, a pro forma invoice, and an advance invoice;

and wherein one-touch payment information is stored in the mobile and wearable device associated with the user, wherein the user activates the one-touch payment mode by holding the mobile and wearable device near a contactless reader and activating a one-touch payment icon on the mobile and wearable device.

2. The method of claim 1, wherein the integrated interface is integrated with at least one mobile application associated with the mobile and wearable device.

3. The method of claim 1, wherein the message includes a text, an audio, a video, and geographical data.

4. The method of claim 1, wherein the data network call is performed via a VoIP service.

5. The method of claim 4, wherein the VoIP service is provided via Wi-Fi, 3G network, 4G network, 5G network, 6G network or upper.

6. The method of claim 1, wherein the call includes an audio call, a video call, and a holographic video call.

7. The method of claim 1, further comprising:
    initiating, by the processor, on a request from the user, the integrated interface.

8. The method of claim 1, wherein the payment request includes a payment recipient, a payment amount, and user financial information associated with the user, wherein the payment recipient and the payment amount are received from the at least one mobile application, and the user financial information is stored on the mobile and wearable device.

9. The method of claim 8, wherein the user financial information includes one or more of the following: bank account information, credit card information, debit card information, gift card information, prepaid card information, insurance account information, merchant account information, mobile currency information, and digital money.

10. The method of claim 1, wherein the one-touch payment mode is used for internet payments, wherein the one-touch payment mode is integrated with one or more of text messaging, hold-to-talk voice messaging, broadcast messaging, sharing of photographs and videos, and location sharing, wherein the one-touch payment mode is associated with exchanging contacts and payments with users nearby via Bluetooth, providing contacting the users at random one-touch payments, and wherein the one-touch payment mode is associated with social networking services, wherein the one-touch payment mode has a common interface with a proprietary, cross-platform instant messaging subscription service for mobile and wearable devices;
    wherein the one-touch payment mode is integrated with a telecommunications application software, the telecommunications application software specializing in providing a video chat, a voice call, and a conference call from mobile and wearable devices; wherein the one-touch payment mode is compatible with one or more operating systems, wherein the one or more operating systems include Microsoft Windows, Mac, Linux, Android, Blackberry, iOS, and Windows Phone; wherein a one-touch payment service associated with the one-touch payment mode is free, wherein the one-touch payment mode includes a freemium mode.

11. The method of claim 1, wherein the mobile and wearable device is configured to act as one or more of the following: a mechanical hybrid smart watch, a smart watch, a digital computing glasses, a digital bracelet, a mobile internet device, a mobile web device, a smartphone, a tablet computer, a wearable computer, a calculator watch, a smartwatch, a head-mounted display, a personal digital assistant, a enterprise digital assistant, a calculator, a handheld game console, a portable media player, an ultra-mobile personal computer, a digital still camera, a digital video camera, a mobile phone, a feature phone, a pager, and a personal navigation device.

12. The method of claim 1, wherein the one-touch payment mode is associated with providing the user with an option to make online purchases and offline purchases using a single touch, wherein the user uses a predefined address and a predefined financial information.

13. A messaging, calling, and one-touch payment system comprising:
  a processor configured to:
    provide an integrated interface for selection of an activity mode, wherein the activity mode includes a messaging mode, a calling mode, and a one-touch payment mode;
    receive the selection of the activity mode via the integrated interface from a user;
    if the messaging mode is selected, receive a message from the user, the message being sent to a recipient via a data network; and
    if the calling mode is selected, initiate a data network call on a call request of the user; and
    if the one-touch payment mode is selected, transmit a payment request to a financial organization, wherein the payment request is generated using data of an actual page on the mobile and wearable device; and
    encrypt the payment request associated with the one-touch payment mode to obtain an encrypted payment request, wherein the encrypted payment request is decryptable by an ephemeral messaging, one-touch payment, and multimedia application of a mobile and wearable device of the recipient, wherein the encrypted payment request is removed from the mobile and wearable device of the recipient after the encrypted payment request is optically read;
    wherein the ephemeral messaging, one-touch payment, and multimedia application is associated with an application protocol, the application protocol being integrated into a communication platform; and
    receive, from the user, a registration request to register the user in a mobile payment service, wherein the user sends the registration request via a mobile payment application associated with the mobile and wearable device, the mobile payment application providing at least a free VoIP service and a free Over-the-Top (OTT) service;
    wherein the mobile and wearable device comprises a band adapted to secure the mobile and wearable device on a human body, the human body including a wrist, an arm, a neck, a head, a leg, a waist, an ear, and a finger, wherein the band is adapted to secure the mobile and wearable device under, within or on clothing, wherein the band includes a rechargeable battery configured to power the mobile and wearable device; and
  a database in communication with the processor, the database, wherein the receiving of the selection of the activity mode includes a voice command, a haptic interaction with a touchscreen of the mobile and wearable device, and a move command, wherein the mobile and wearable device comprises one or more haptic control elements to control operation or functions of the mobile and wearable device, and wherein access to the mobile and wearable device is controlled by one or more of the following: a password, a Personal Identification Number code, and biometric authorization, the biometric authorization including fingerprint scanning, palm scanning, face scanning, and retina scanning, wherein the scanning is performed using the one or more biometric sensors, wherein the one or more biometric sensors include sensors for sensing a command for the one-touch payment mode, the sensing shown on the display, the mobile and wearable device further comprising a fingerprint reader configured to scan a fingerprint, the scanned fingerprint being matched to one or more approved fingerprints, wherein access to the mobile and wearable personal digital is granted based on the matching;
    wherein the mobile and wearable device further comprises a camera configured to capture one or more codes, the one or more codes including electronic key data, a link to a web-resource, a payment request, and advertising information, wherein the one or more codes include barcode, a linear dimensional code, a two-dimensional code, a snap tag code, and a QR code;
    wherein the mobile and wearable device is operable to obtain information about a payment system of the user, wherein the mobile and wearable device is operable to generate and display a barcode that encodes user payment information, the barcode being scanned at a checkout counter and processed to retrieve the user payment information from a database of a payment processing system, the user payment information being used to transfer funds between the user and the recipient, wherein the recipient is a merchant;
    wherein the mobile and wearable device is associated with an electronic payment card configured to act as one or more of a smart card, a proximity card, an integrated circuit card, a magnetic strip card, and an electronic payment card, the electronic payment card storing card data of one or more debit cards, credit cards, gift cards, loyalty cards, prepaid cards, bank cards, identity cards, and membership cards, wherein the electronic payment card is configured to attach to the mobile and wearable device;
    wherein the system further comprises scanning the code, the code being present on a one-touch QR code invoice, the one-touch QR code invoice storing one or more of invoice data, monetary amount summary, product data, service data, merchant data, invoice number, and amount to be paid, the one-touch QR code invoice being associated with one or more of an invoice, a credit note, a debit note, a pro forma invoice, and an advance invoice;
    and wherein one-touch payment information is stored in the mobile and wearable device associated with the user, wherein the user activates the one-touch payment mode by holding the mobile and wearable device near a contactless reader and activating a one-touch payment icon on the mobile and wearable device.

14. The system of claim 13, wherein the system is associated with one or more of a transactional payment based on Unstructured Supplementary Service Data, Short Message Service, direct operator billing, a credit card mobile payment, an online wallet, a QR code payment, contactless near field communication payment, a cloud-based mobile payment, an audio signal-based payment, a Bluetooth Low Energy signal beacon payment, an in-application payment, a software development kit (SDK) payment, an application programming interface (API) payment, a social networking payment, and a direct carrier and bank co-operation. wherein the system is compatible with a third party application, wherein the system is associated with one or more of an API and an SDK, wherein the system is further associated with a fingerprint touch recognition payment, a fingerprint press recognition payment, a gesture mark payment, a voice command payment, and a eye blink payment, a fingerprint swipe recognition payment, and a nod payment.

15. The system of claim 13, wherein the message includes a text, an audio, a video, and geographical data, wherein the message is sent to a controlled list of recipients, wherein the user sets a time limit for the recipient to view the message, wherein after the time limit the message is deleted from a mobile and wearable device associated with the recipient.

16. The system of claim 13, wherein the data network call is performed via a VoIP service.

17. The system of claim 13, wherein the VoIP service is provided via Wi-Fi, 3G network, 4G network, 5G network, 6G network or upper.

18. The system of claim 13, wherein the call includes an audio call, a video call, and a holographic video call.

19. The system of claim 13, wherein the receiving of the selection of the activity mode includes a voice command, a haptic interaction with a touchscreen, and a move command.

20. The system of claim 13, wherein the payment request includes a payment recipient, a payment amount, and user financial information associated with the user, wherein the payment recipient and the payment amount are received from the at least one mobile application, and the user financial information is stored on the mobile and wearable device.

21. The system of claim 13, wherein the one-touch payment is secured by two-factor authentication.

22. The system of claim 13, wherein the processor is further configured to, on receiving a signal by near field communication, perform a payment using the user financial information, wherein the payment is performed on condition of an approval of the user.

23. The system of claim 13, wherein the processor is further configured to receive a Bluetooth Low Energy (BLE) signal, the BLE signal being sensed by the mobile and wearable device of the user, the user being authenticated via the BLE signal.

24. The system of claim 13, wherein the processor is further configured to initiate on a request from the user, the integrated interface, wherein the integrated interface is initiated based on authorization verification.

25. The system of claim 13, wherein the user provides a password, a security code, or biometric information for authorization verification.

26. The system of claim 13, wherein the payment request is associated with a virtual currency.

27. The system of claim 26, wherein the virtual currency is customized according to personal data of the user.

28. The system of claim 26, wherein the user provides the user payment data during registration.

29. A non-transitory computer-readable medium comprising instructions, which when executed by one or more processors, perform the following operations:
provide an integrated interface for selection of an activity mode, wherein the activity mode includes a messaging mode, a calling mode, and a one-touch payment mode;
receive the selection of the activity mode via the integrated interface from a user;
if the messaging mode is selected, receive a message from the user, the message being sent to a recipient via a data network; and
if the calling mode is selected, initiate a data network call on a call request of the user; and
if the one-touch payment mode is selected, transmit a payment request to a financial organization, wherein the payment request is generated using data of an actual page on the mobile and wearable device;
encrypt the payment request associated with the one-touch payment mode to obtain an encrypted payment request, wherein the encrypted payment request is decryptable by an ephemeral messaging, one-touch payment, and multimedia application of a mobile and wearable device of the recipient, wherein the encrypted payment request is removed from the mobile and wearable device of the recipient after the encrypted payment request is optically read;
wherein the ephemeral messaging, one-touch payment, and multimedia application is associated with an application protocol, the application protocol being integrated into a communication platform; and
receive, from the user, a registration request to register the user in a mobile payment service, wherein the user sends the registration request via a mobile payment application associated with the mobile and wearable device, the mobile payment application providing at least a free Voice over Internet Protocol (VoIP) service and a free Over-the-Top (OTT) service;
wherein the mobile and wearable device comprises a band adapted to secure the mobile and wearable device on a human body, the human body including a wrist, an arm, a neck, a head, a leg, a waist, an ear, and a finger, wherein the band is adapted to secure the mobile and wearable device under, within or on clothing, wherein the band includes a rechargeable, wherein the receiving of the selection of the activity mode includes a voice command, a haptic interaction with a touchscreen of the mobile and wearable device, and a move command, wherein the mobile and wearable device comprises one or more haptic control elements to control operation or functions of the mobile and wearable device, and wherein access to the mobile and wearable device is controlled by one or more of the following: a password, a Personal Identification Number code, and biometric authorization, the biometric authorization including fingerprint scanning, palm scanning, face scanning, and retina scanning, wherein the scanning is performed using the one or more biometric sensors, wherein the one or more biometric sensors include sensors for sensing a command for the one-touch payment mode, the sensing shown on the display, the mobile and wearable device further comprising a fingerprint reader configured to scan a fingerprint, the scanned fingerprint being matched to one or more approved fingerprints, wherein access to the mobile and wearable personal digital is granted based on the matching;
wherein the mobile and wearable device further comprises a camera configured to capture one or more codes, the one or more codes including electronic key data, a link to a web-resource, a payment request, and advertising information, wherein the one or more codes include barcode, a linear dimensional code, a two-dimensional code, a snap tag code, and a QR code;
wherein the mobile and wearable device is operable to obtain information about a payment system of the user, wherein the mobile and wearable device is operable to generate and display a barcode that encodes user payment information, the barcode being scanned at a checkout counter and processed to retrieve the user payment information from a database of a payment processing system, the user payment information being used to transfer funds between the user and the recipient, wherein the recipient is a merchant;
wherein the mobile and wearable device is associated with an electronic payment card configured to act as one or more of a smart card, a proximity card, an integrated circuit card, a magnetic strip card, and an electronic payment card, the electronic payment card storing card data of one or more debit cards, credit cards, gift cards, loyalty cards, prepaid cards, bank cards, identity cards, and membership cards, wherein the electronic payment card is configured to attach to the mobile and wearable device;

wherein the system further comprises scanning the code, the code being present on a one-touch QR code invoice, the one-touch QR code invoice storing one or more of invoice data, monetary amount summary, product data, service data, merchant data, invoice number, and amount to be paid, the one-touch QR code invoice being associated with one or more of an invoice, a credit note, a debit note, a pro forma invoice, and an advance invoice;

and wherein one-touch payment information is stored in the mobile and wearable device associated with the user, wherein the user activates the one-touch payment mode by holding the mobile and wearable device near a contactless reader and activating a one-touch payment icon on the mobile and wearable device.

\* \* \* \* \*